(12) United States Patent
Allen et al.

(10) Patent No.: US 8,056,114 B2
(45) Date of Patent: Nov. 8, 2011

(54) IMPLEMENTING ACCESS CONTROL POLICIES ACROSS DISSIMILAR ACCESS CONTROL PLATFORMS

(75) Inventors: Paul L. Allen, Redmond, WA (US);
Ming-Yuh Huang, Bellevue, WA (US);
Phyllis Melvin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1062 days.

(21) Appl. No.: 11/209,987

(22) Filed: Aug. 23, 2005

(65) Prior Publication Data

US 2007/0056019 A1 Mar. 8, 2007

(51) Int. Cl.
*G06F 17/00* (2006.01)
*H04L 29/06* (2006.01)
(52) U.S. Cl. .............................. 726/1; 726/27
(58) Field of Classification Search .................. 726/1
See application file for complete search history.

(56) References Cited

U.S. PATENT DOCUMENTS

| | | | |
|---|---|---|---|
| 2,958,179 A | 11/1960 | Wolfe et al. | |
| 6,023,765 A | 2/2000 | Kuhn | |
| 6,324,647 B1 | 11/2001 | Bowman-Amuah | |
| 6,640,307 B2 | 10/2003 | Viets et al. | |
| 7,178,033 B1 * | 2/2007 | Garcia | 713/184 |
| 7,340,469 B1 * | 3/2008 | Alghathbar et al. | 1/1 |
| 2004/0093518 A1 | 5/2004 | Feng et al. | |
| 2004/0193909 A1 | 9/2004 | Chang et al. | |
| 2005/0166260 A1 | 7/2005 | Betts et al. | |
| 2005/0268325 A1 * | 12/2005 | Kuno et al. | 726/1 |
| 2006/0090131 A1 * | 4/2006 | Kumagai | 715/700 |

FOREIGN PATENT DOCUMENTS

| | | | |
|---|---|---|---|
| WO | WO 01/33349 A2 | | 5/2001 |
| WO | WO 02/101975 A1 | | 12/2002 |
| WO | WO2005/009003 | * | 1/2005 |
| WO | WO 2005/009003 | * | 1/2005 |
| WO | WO 2005/009003 A1 | | 1/2005 |

OTHER PUBLICATIONS

Indrakshi, Ray, "Using UML to Visualize Role-Based Access Control Constraints," SACMAT 04', Jun. 2-4, 2004, Copyright 2004.*
Indraski, Ray, Using UML to Visualize Role-Based Access Control Constraints, PUblished Jun. 2-4, 2004, Copyright, 2004.*
"Using UML to Visualize Role Based Access Control Contraints," Indrakshi, Ray, SACMAT'04, Jun. 2-4, 2004, Yorktown, Heights, New York, USA.*
Adda et al., MceTech, Jan. 19, 2005.

(Continued)

Primary Examiner — Kambiz Zand
Assistant Examiner — Dant Shaifer Harriman
(74) Attorney, Agent, or Firm — Harness, Dickey & Pierce, P.L.C.

(57) ABSTRACT

A method of implementing access control requirements to control access to a plurality of system resources. The requirements are modeled as contents of security policies. The security policy contents are integrated into a policy set. Representations of the integrated policy set are generated, each representation corresponding to a target system that controls access to the resources. The policy set representation(s) are integrated with the corresponding target system(s) to implement the policy set. This method makes it possible to implement high-level security requirements correctly and consistently across systems of a system-of-systems (SoS) and/or distributed system.

18 Claims, 4 Drawing Sheets

OTHER PUBLICATIONS

Hannover et al., Rule-based Policy Specification: State of the Art and Future Work, 2004.
Damianou et al., A Survey of Policy Specification Approaches, Apr. 2002.
XACML, Aug. 23, 2005.
Hassan, Process based governance using Policies.
Unified Modeling Language, Aug. 23, 2005.
Ray et al., Using UML to Visualize Role-Based Access Control Constraints, 2004.
IBM Rational Software Modeler, Oct. 2004.
Ferraiolo et al., Role Based Access Control, Aug. 23, 2005.
White Papers and Business Guides, Aug. 23, 2005.
Acevedo et al., Enterprise Security Applications of Partition Rule Based Access Control (PRBAC), Aug. 23, 2005.
Manish Verma, XML Security: Control information access with XACML, Aug. 23, 2005.
Johnson, M. et al., KAoS Semantic Policy and Domain Services: An Application of DAML to Web Services-Based Grid Architectures; Proceedings of the AAMAS 03 Workshop on Web Services and Agent-Based Engineering; Melbourne, Australia; 2003.
Suri, N., et al., DAML-based Policy Enforcement for Semantic Data Transformation and Filtering in Multi-agent Systems; Proceedings of the Autonomous Agents and Multi-Agent Systems Conference (AAMAS 2003); Melbourne, Australia; New York, NY: ACM Press; 2003.
Tonti, G., et al., Semantic Web Languages for Policy Representation and Reasoning: A Comparison of KAoS, Rei, and Ponder; Submitted to the International Semantic Web Conference (ISWC 03); Sanibel Island, Florida; 2003.
Uszok, A., et al., KAoS Policy and Domain Services: Toward a Description-Logic Approach to Policy Representation, Deconfliction, and Enforcement; Proceedings of Policy 2003; Como, Italy, in press; 2003.
Uszok, A., et al., DAML Reality Check: A Case Study of KAoS Domain and Policy Services; Submitted to the International Semantic Web Conference (ISWC 03); Sanibel Island, Florida; 2003.
Article on Mixed Radix; http://en.wikipedia.org/wiki/Mixed_radix; Feb. 10, 2009.
Vainstein, F., et al., Reduction in Space Complexity and Error Detection/Correction of a Fuzzy Controller; 2006.
Richardson, A., et al.; Variable-Radix Integrated Counter; Electronic Letters, Dec. 1966, vol. 2, issue No. 12; pp. 448-449.

* cited by examiner

IMPLEMENTING ACCESS CONTROL POLICIES ACROSS DISSIMILAR ACCESS CONTROL PLATFORMS

CROSS-REFERENCE TO RELATED APPLICATIONS

This application is related to U.S. patent application Ser. No. 11/209,985, filed on the same date as this application. The disclosure of the foregoing related application is incorporated herein by reference in its entirety.

FIELD OF THE INVENTION

The present invention relates generally to controlling access by users to system resources and more particularly (but not exclusively) to implementing security requirements in systems having a plurality of dissimilar access control mechanisms.

BACKGROUND OF THE INVENTION

For a business or other enterprise that utilizes large computer systems, implementing large-scale integration (LSI) of its computer systems can increase efficiency and reduce costs. Integrating the operation of mechanisms that control access to system resources, however, can pose challenges. Security authorization requirements need to be incorporated systematically so that they may be implemented adequately and accurately. It can be difficult to implement security requirements coherently over a plurality of functionally different end environments and applications.

SUMMARY OF THE INVENTION

The present invention, in one implementation, is directed to a method of implementing a plurality of access control requirements to control access to a plurality of system resources. The requirements are modeled as contents of security policies. The security policy contents are integrated into a policy set. One or more representations of the integrated policy set are generated, each representation corresponding to one of one or more target systems that control access to the resources. The policy set representation(s) are integrated with the corresponding target system(s) to implement at least part of the policy set.

In another implementation, the invention is directed to a method of implementing a plurality of access control requirements to control access to a plurality of system resources. The method includes modeling the requirements as contents of security policies. The security policy contents are integrated into a policy set. The integrated policy set is adapted to obtain one or more expressions of the access control requirements compatible with one or more target systems that control access to the resources. The expression(s) are incorporated into the target system(s) to implement the security policy contents relative to the resources.

In yet another implementation, the invention is directed to an apparatus for implementing a plurality of access control requirements to control access to a plurality of system resources. The apparatus includes one or more processors and memories configured to model the requirements as contents of security policies. The processor(s) and memory(s) also are configured to integrate the security policy contents into an authorization-markup-language policy set, adapt the integrated policy set to express the policy contents compatibly with one or more target systems that control access to the resources, and incorporate the expressed policy contents into the target system(s) to implement the access control requirements relative to the resources.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF EMBODIMENTS

The following description of various embodiments is merely exemplary in nature and is in no way intended to limit the invention, its application, or uses.

The present invention, in some implementations, is directed to methods and apparatus for implementing a plurality of access control requirements for controlling access to resources in a computerized system. Such systems may include distributed systems and/or systems-of-systems (SoSs). Such systems typically have a plurality of resources, including but not limited to files, databases, directories, servers, etc., each of which may have one of a plurality of different security mechanisms.

In some implementations of the invention, authorization policy contents are integrated into a policy set. The integrated policy set is adapted to express the policy contents compatibly with one or more target systems that control access to the resources. The expressed policy contents are incorporated into the target system(s) to implement the access control requirements relative to the resources.

Figure 1:
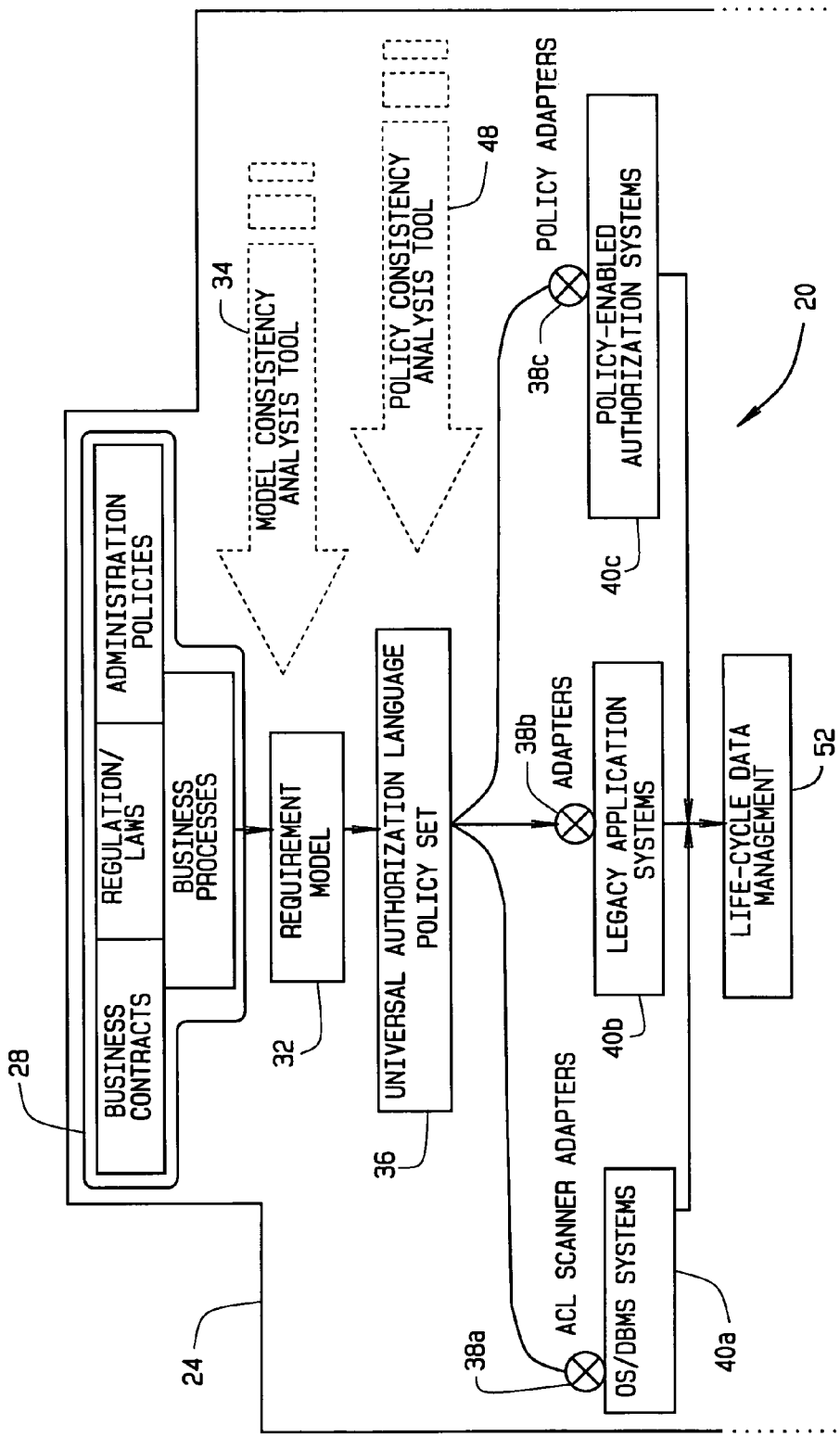
FIG. 1 is a conceptual diagram of an apparatus for implementing requirements for controlling access to resources of a system in accordance with one implementation of the invention.

An apparatus for implementing requirements for controlling access to resources of a system is indicated generally in FIG. 1 by reference number 20. The apparatus 20 may include all or part of a distributed system and/or SoS 24, although other system configurations also are possible. The apparatus 20 includes at least one processor and memory, although a plurality of computers, processors and/or memories would typically be used in implementing access control requirements in accordance with principles of the invention.

Defining security authorization policies typically is begun by defining authorization requirements 28. Such requirements may be derived from one or more information repositories at the human level. In a large enterprise, e.g., a system-of-systems (SoS), a variety of sets of security requirements are typically documented in information repositories. Requirements could include policies in areas such as export control regulations, business contracts, proprietary information agreements, company policies, and operation guidelines. In an authorization context, it is human security policies that define "who can access what".

The apparatus 20 is used to model the authorization requirements 28 to obtain a requirement model 32 representing contents of access control policies. In some implementations of the invention, a Unified Modeling Language (UML)

profile, i.e., a set of UML stereotypes, is defined to support access control requirements and is used to model the access control requirements 28. A tool 34 may be used to perform UML model consistency checking.

From the model 32 is generated a set 36 of policies capturing the requirements. The policy set 36 is expressed in an authorization markup language, referred to herein as a Universal Authorization Language (UAL). The requirements 28 are transformed from the standards-based UML model 32 into a UAL format. The UAL may be, for example, a subset of XACML (extensible Access Control Markup Language). It should be noted, however, that other modeling languages and/or authorization languages could be used in other implementations of the invention. A tool 48 may be used to perform UAL policy consistency checking.

The UAL format of the policy set 36 can be adapted, for example, by one or more environment-specific adapters 38 to populate a plurality of heterogeneous access control systems or mechanisms 40. In FIG. 1 are shown three adapters 38a-c corresponding to three target systems 40a-c. Target environments may include, for example, access control list (ACL)-based operating systems and database management systems 40a, legacy application systems 40b, and/or policy-enabled authorization systems 40c.

Sometimes, the security requirements 28 may dictate authorization with conditions. Conditions could include identity-based data marking, e.g., using watermarking technology to tie data to a specific receiver, and/or remote data management, e.g., using tethered documents that could be erased and/or revised remotely in the future. Accordingly, various applicable technologies 52 may be invoked to complete a security authorization engineering process.

The UAL policy set 36 is directly derived from the UML model 32. Accordingly, the UAL policies 36 appropriately reflect the original natural-language requirements 28 incorporated into the UML model 32. The policy set 36 may be adapted and implemented into a target system 40 for enforcement in accordance with the security requirements 28. Defining policies in accordance with various implementations of the invention can be an iterative and circular process. New access control requirements typically trigger a UML model update, UAL policy re-generation, and updates to end target systems 40.

To implement the UAL policy set 36 in an OS target environment 40a, an ACL adapter 38a may be used, depending on OS variety. An adapter 38a may translate policies 36 into filesystem ACLs, user groups, and user account configuration. For a legacy application system 40b, an adapter 38b may map the UAL to built-in authorization mechanisms of the legacy system. For a policy-enabled authorization system 40c, an adapter 38c can utilize the expressiveness of end-system policy constructs (such as in Oblix, Sun One, P-RBAC, etc.) and closeness in policy syntax.

It should be noted that the adapters 38 are not necessarily purely technical solutions. It is important to capture a part (if any) of a policy set that cannot be implemented versus the part that can. Therefore, the adapters 38 also capture and highlight parts that cannot be translated or implemented for human risk management process. For example, where a system 40a is a Linux system that does not have a mechanism for determining the location of a system user, it could be difficult to implement on such system a policy that "engineers who are US persons may read EAR-sensitive documents if the engineers are in the US." In such case, the adapter 38a might return an error message stating which policy(s) could not be implemented on the target system 40a, and a human could then implement a risk management process.

It can be observed from FIG. 1 that the apparatus 20 may be used vertically to define security requirements 28, model the requirements in UML, and generate UAL policies 36. Modeling of security requirements and generation of UAL policies may be performed, for example, as described in U.S. patent application Ser. No. 11/209,985, the disclosure of which is incorporated herein by reference in its entirety. Horizontally, adapters 38 translate UAL policies 36 and implement them into various target systems 40. Under this framework, the authorization requirements 38 are vertically captured and horizontally enforced in a plurality of systems 40. End target system 40 local security updates can propagate upward for policy comparison, potentially laterally to other systems 40, and upward to UML model 32 and security requirements 28 for updates.

An example shall now be described to illustrate a context in which the invention may be implemented. Consider a scenario in which an enterprise, "Company A", has two partners, "Partner B" and "Partner C", with whom it shares documents. Legal contracts with the partners permit Partner C employees to view engineering images and Partner B employees to view wiring images. Company A further requires that engineering images viewed by partners must include digital watermarks. (Company A employees can view watermarked or non-watermarked engineering images.) US law stipulates that only US Persons can view EAR sensitive information.

Company A maintains shared documents on a Linux system that uses access control lists (ACLs) to control access to directories and files. Other shared documents are maintained on a Web server that uses Policy-enabled, Role Based Access Control (P-RBAC) software for authorization decisions.

As previously mentioned with reference to FIG. 1, a user, e.g., a Company A security administrator, can capture the foregoing security requirements, model them using UML, and automatically generate a policy set representation in UAL, which in the present implementation is a subset of XACML. Using the XACML representation as input, an ACL adapter can be used to calculate appropriate ACLs and apply them to the Linux system. Similarly, a P-RBAC adapter can be used to generate a representation of the policy set using P-RBAC policy language and then push the new policy to the P-RBAC system used by the Web server.

Continuing the above example, Mary is a Company A employee, Ike is a Partner C employee, and Francis is a Partner B employee. Mary is a US Person and Ike and Francis are not. After the administrator has applied the policy set to the target systems, when Mary, Ike, or Francis uses either the Linux system or the Web server to access documents, they encounter consistent access control policies that reflect the original security requirements. Mary is able to view wiring and engineering images, including EAR-sensitive ones. She can also read watermarked or non-watermarked images. Ike can view watermarked engineering images that are not EAR-sensitive. Francis can view wiring images that are not EAR-sensitive. For example, when Francis uses the web to browse documents in a particular P-RBAC controlled folder, he sees only a non-EAR sensitive wiring document. In contrast, when Mary accesses the same folder, she is permitted to view more types of information, including wiring and engineering, watermarked and non-watermarked, EAR-sensitive and non-EAR-sensitive documents.

Figure 2:
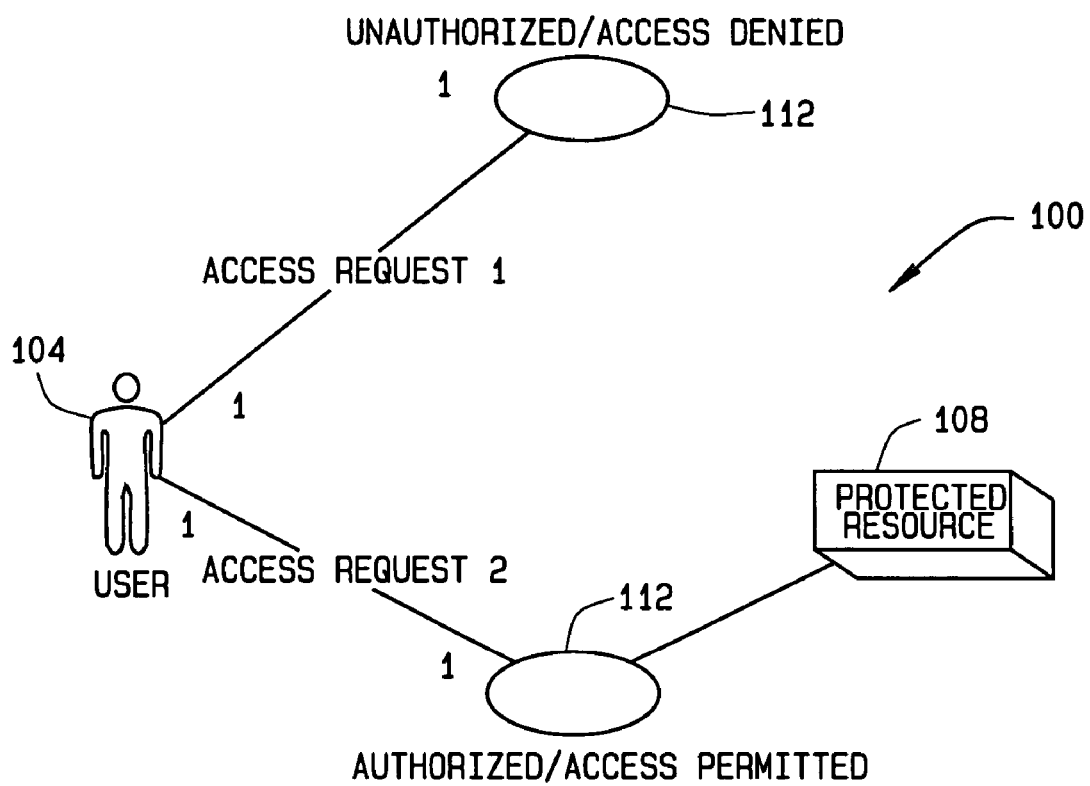
FIG. 2 is a use case diagram modeling policy content in accordance with one implementation of the invention.

In some configurations, authorization requirements are captured and expressed using the Unified Modeling Language (UML) and Object Constraint Language (OCL). General authorization and access control requirements can be modeled in a standard UML use case diagram indicated generally in FIG. 2 by reference number 100. In the diagram 100 are modeled a user 104 making a request relative to a resource 108. As illustrated in FIG. 2, at a top level of abstraction there are only two cases 112: Authorized/Access Permitted, and Unauthorized/Access Denied.

The foregoing use cases could be implemented in various access control environments. For example, in a policy-driven role-based access control environment, an attempt to access some protected information resource would be intercepted by a policy enforcement point (PEP). An enforcer would provide information about the requesting entity, the nature of the access requested, and the targeted resource to a policy decision point (PDP). The decision point would consult an access control policy to determine whether the requestor has privileges sufficient to authorize the requested access, and would return a decision to the enforcement point.

In some implementations of access control policy models, standard UML stereotype and profile extension mechanisms are used to provide model elements specific to the authorization and access control problem domain. In some implementations of the invention, a UML model is built that represents the contents of policies as would be consulted by decision points. Such modeling is in contrast to modeling to represent an access control system per se. Modeling analysis in accordance with principles of the invention is abstract, yet complete enough to expose the fundamental elements to be considered when modeling authorization requirements specific to a given information system.

One implementation of a model for expressing access control policy employs five core elements: Subject, Role, Action, Resource, and Constraint. A Subject element represents a human user or a system component (such as a server process) acting on behalf of a person. In the context of an access control scenario, the Subject initiates a request to access some Resource. Each Subject has one or more identifying attributes, including but not limited to any number of assigned Roles. Roles may represent job functions, resource ownership, levels of authority, etc. As such, a Role can serve as a mechanism for aggregating individual Subjects into groups. Groups may be collectively permitted or denied access permissions on resources. Examples of Roles may be US Person, Company A Engineer, Partner B Engineer, Partner C Engineer, etc.

Actions define types of access that may be requested relative to Resources and may include, e.g., read, write, etc. In an object-oriented system, some Actions may represent methods of target Resource objects. Resources represent information objects that are protected against unauthorized access. In some implementations, a granularity at which Resources are defined is not specified. Examples of Resources may be files, server systems, databases or database records, URLs, etc. Whatever the level of resource division, protected resources can be identified with attributes relevant to an access control policy being defined, for example, a "type" of resource, and/or whether a resource contains export sensitive information.

Constraints are used to define a logical content of individual access control policies being defined in the system. In some models configured in accordance with principles of the invention, Constraint logic is expressed in the Object Constraint Language (OCL). OCL statements include Boolean expressions that refer to objects represented by elements in the model and their attributes. Two types of Constraints are defined: one Constraint is to Permit access and the other Constraint is to Deny access. Semantically, a Permit Constraint expresses a condition under which an access is allowed, and a Deny Constraint expresses a condition under which an access is explicitly disallowed.

Figure 3:
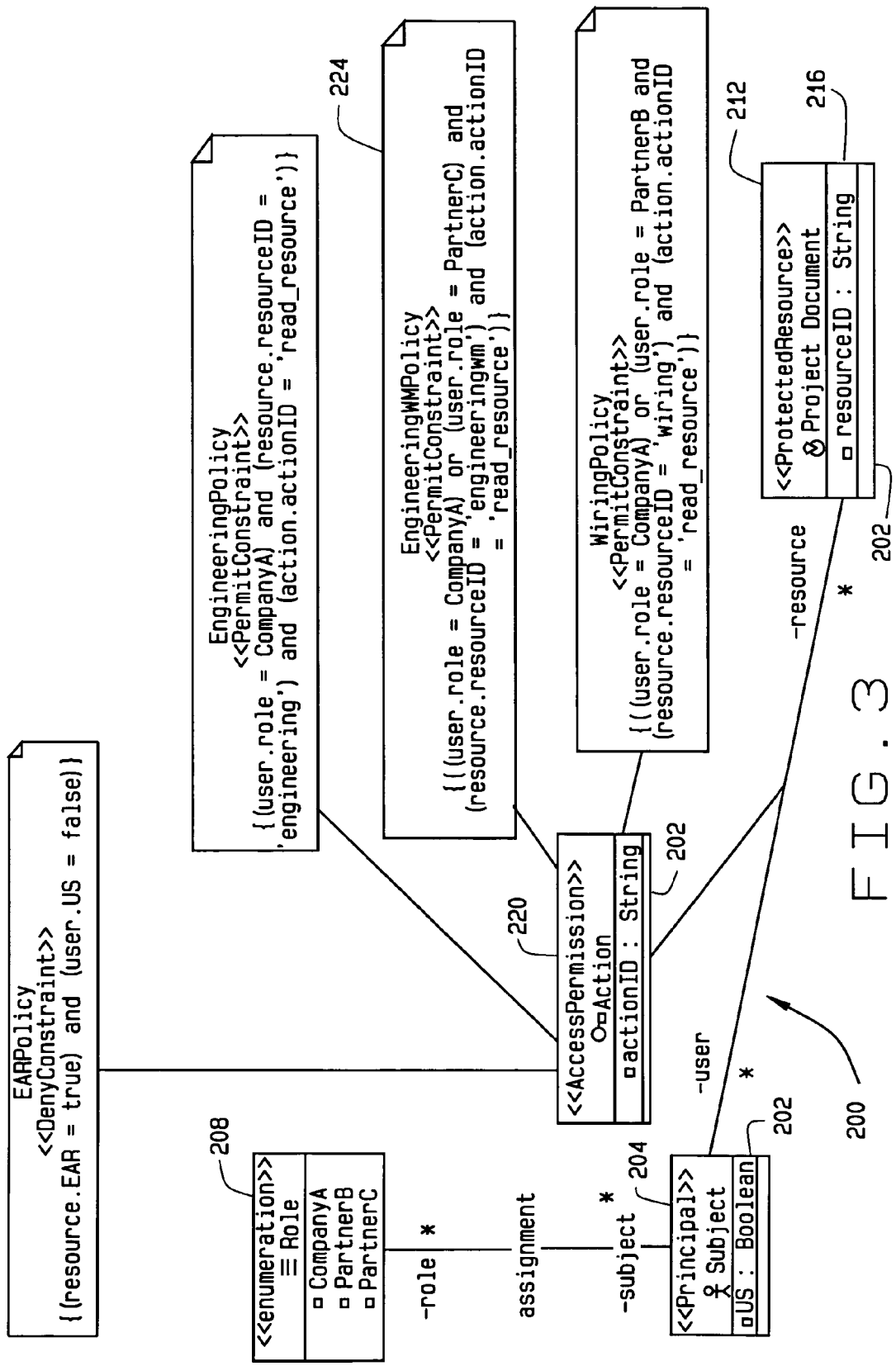
FIG. 3 is a UML requirements model in accordance with one implementation of the invention.

An example of a complete model expressing a set of access control policies that protect information in a collaborative engineering support system is indicated generally in FIG. 3 by reference number 200. The model 200 models an engineering system with Subjects 204 that act on behalf of end users. Users are assumed to be authenticated into the system, and authorization-relevant attributes of every Subject 204 are determinable. Such attributes may include, e.g., Roles 208 assigned to a Subject and/or whether or not the Subject represents a US Person. Subjects 204 may make requests to access protected resources known as Project Documents 212. Each Project Document 212 has an ID 216 that specifies what type of information it carries, as well as an attribute indicating whether or not the information is export restricted. Every access attempt that Subjects 204 can make on Project Documents 212 is mediated by an Action 220. Actions 220 are constrained by Policies 224 that dictate conditions under which a given Action 220 (invoked by a specific Subject 204, on a specific Project Document 212) is explicitly permitted or denied.

In some implementations, IBM Rational System Architect (IBM/RSA) is used as a UML model-authoring environment. Capabilities may be added via a "plug-in" architecture. Automated policy generation is performed using a plug-in that operates on an authorization requirements model as follows:

The entire authorization requirements model is traversed.
All Deny Constraints and Allow Constraints are extracted.
OCL contained in each Constraint is parsed.
One or more XACML Rules are constructed for each Constraint.
The Rules are inserted into a stylized XACML Policy Set.
The Policy Set is output as an XML file.

The plug-in may be written, for example, in Java. OCL parsing may be performed, for example, using an ANTLR grammar.

Universal Authorization Language

In light of costs typically associated with administering the current diversity of access control technologies, a single language for the expression of policy across access control domains is desirable. For broad applicability, it can be desirable for a UAL to be flexible, extensible, and a widely accepted standard. XACML is an emerging standard language that expresses policy for controlling access to actions by subjects on resources. A subject represents an authenticated user or an authenticated system account. A resource is any data object that is accessible to subjects. An action is any well-defined operation that a subject might wish to perform on a resource. Actions, subjects, and resources all have attributes whose values may be looked up during policy evaluation.

The XACML specification does not contemplate that actions, roles, or resources might have hierarchical relationships with each other or that they might inherit policy from each other. The XACML specification also does not contemplate that policy might live in administrative domains that have hierarchical relationships with each other.

Figure 4:
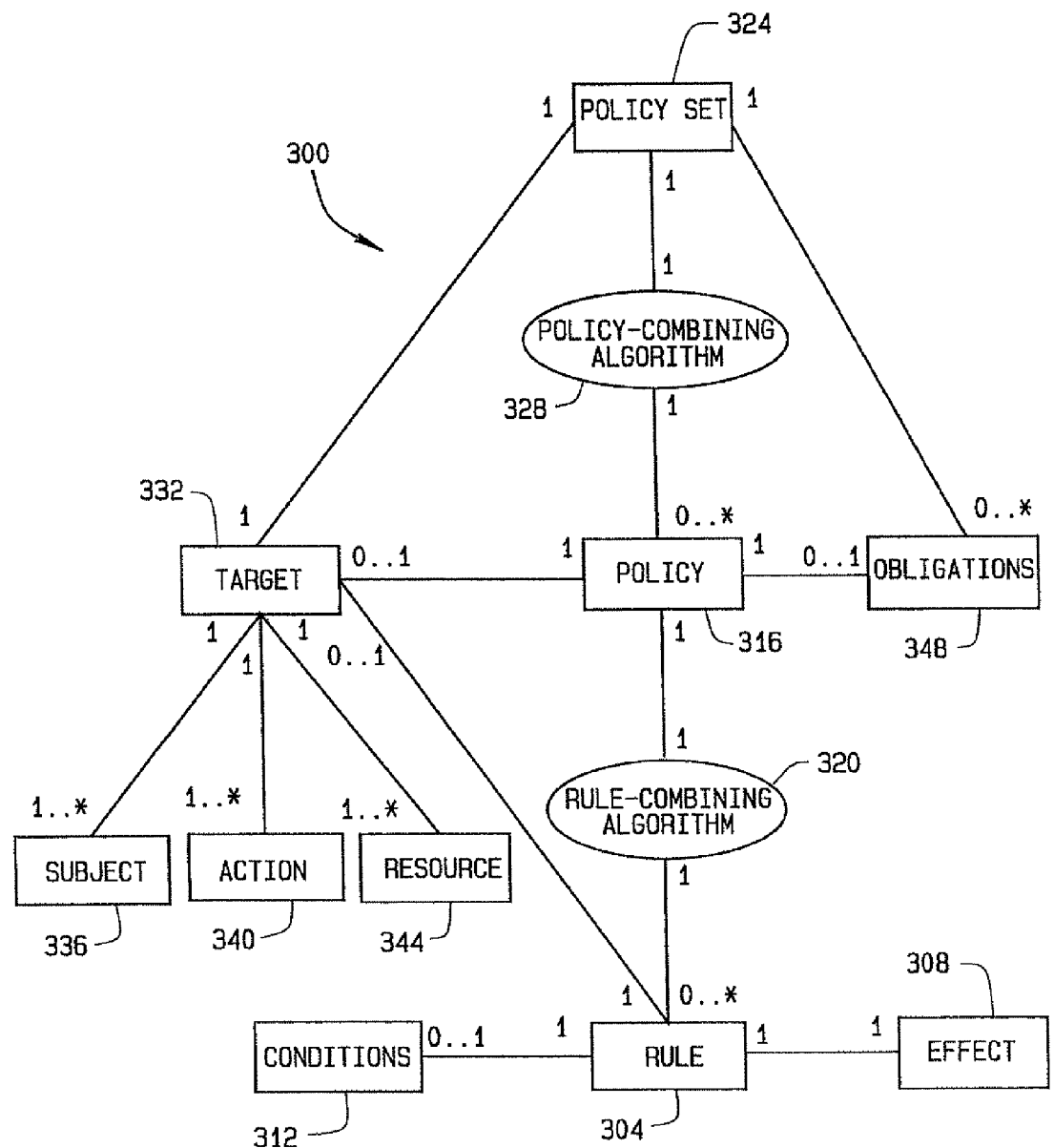
FIG. 4 is a block diagram illustrating elements of XACML.

Various implementations of the disclosure are discussed with reference to conventional relationships among key elements of XACML indicated generally in FIG. 4 by reference number 300. Policy conditions are contained in XML <Rule> elements 304. <Rule> elements each have an "Effect" attribute 308 with a value of either "Permit" or "Deny". A rule's effect has consequences only when the rule's<Condition> element 312 evaluates to true. Effects of multiple rules may be combined into a <Policy> element 316 using one of several possible combining algorithms 320. Policies 316 may be combined into <PolicySet> elements 324 using one of several possible combining algorithms 328. The applicability of policies 316 and policy sets 324 is restricted through the use of <Target> elements 332. A target specifies the set of subjects 336, actions 340, and resources 344 that "match" a particular policy 316 or policy set 324. Obligations 348 may be associated with policies or with policy sets and become activated when the combined effect of a policy or policy set is "Permit".

In operation, an XACML PEP may construct a "request context" specifying the attributes of a particular subject, action, and resource. The request context is sent to a PDP, which determines the applicable policies, and combines the effects of the relevant rules using the appropriate combining algorithms. The result (along with any associated obligations) is sent back to the PEP for enforcement.

XACML contains some features (obligations and some of the combining algorithms, for example) that do not map cleanly to any known target access control system. Accordingly, we have defined a subset of XACML for use as a UAL. In one implementation, the UAL is based on plain XACML version 1.1 with no support for hierarchies or other advanced features. The UAL is configured to permit a single expression of policy to be adapted to and enforced in a plurality of target access control systems. The UAL subset of XACML preferably is rich enough to support adaptation to existing access control targets, yet simple enough to permit efficient and correct implementation.

The XACML specification allows attributes of actions to be used in policy. No known policy target needs this feature, so the UAL does not currently support it.

XACML requires that both policy sets and policies specify targets. Since the UAL has only a single policy set, it does not need a restrictive <Target> element. The policy set in the UAL therefore has a wildcard target as follows:

```
<Target>
    <Subjects><AnySubject/></Subjects>
    <Resources><AnyResource/></Resources>
    <Actions><AnyAction/></Actions>
</Target>
```

The UAL uses the <Target> element of a policy to specify the names of the action and resource to which the policy applies. The UAL allows either or both of these to be wildcarded. Other than the wildcard mechanism, the UAL does not allow a policy target to match more than one action or resource. In the UAL, <Target> elements refer to resource and action names using the XACML standard attributes, "resource-id" and "action-id". No other attributes may be specified in a UAL <Target> element. The following example shows a <Target> element specifying the "read_resource" action on the "engineering" resource:

```
<Target>
    <Subjects>
        <AnySubject/>
    </Subjects>
    <Resources>
        <Resource>
            <ResourceMatch MatchId="&function;string-equal">
                <AttributeValue
                    DataType="&xml;string">engineering</AttributeValue>
                <ResourceAttributeDesignator
                    DataType="&xml;string"
                    AttributeId="urn:oasis:names:tc:xacml:1.0:resource:resource-id"/>
            </ResourceMatch>
        </Resource>
    </Resources>
    <Actions>
        <Action>
            <ActionMatch MatchId="&function;string-equal">
                <AttributeValue
                    DataType="&xml;string">read_resource</AttributeValue>
                <ActionAttributeDesignator
                    DataType="&xml;string"
                    AttributeId="&action;action-id"/>
            </ActionMatch>
        </Action>
    </Actions>
</Target>
```

In XACML, it is possible to express policy conditions as part of <Target> elements that act to restrict the set of policies that apply to a particular access request. Target systems typically do not need this sort of flexibility in order to express useful policies, so we restrict targets to specifying just the name of the action and the name of the resource. In the UAL, all policy conditions are contained in <Rule> elements.

XACML allows <PolicySet> elements to contain other policy sets, with different combining algorithms at each level. The UAL, however, uses a single <PolicySet> element that may contain several <Policy> elements, each of which may contain several <Rule> elements. Only the "deny-overrides" combining algorithm is recognized by the UAL.

Note that the subject in the above target is wildcarded ("AnySubject"). A policy, for example, controlling read access by non-citizens to any resource could be implemented using a <Target> element with a wildcard resource and a specific action. A UAL policy set generated from the model 200 (shown in FIG. 3) is incorporated herein as Appendix A and uses a wildcard Deny policy and specific Permit policies.

In XACML, multiple policies may apply to the same access request and each policy may contain multiple <Rule> elements with differing <Effect> elements. Within the constraints on the content of <Target> elements, the UAL is consistent with XACML. <PolicyId> and <RuleId> elements are allowed.

The XACML specification defines four algorithms for combining the Effects of policies and rules: deny-overrides, permit-overrides, first-applicable, and only-one-applicable. With the deny-overrides algorithm, any rule or policy with an Effect attribute of "Deny" takes precedence over rules or policies with an Effect attribute of "Permit. Further, users of the XACML specification are allowed to define their own combining algorithms. Since complexity increases with the number of combining algorithms and useful policies can be crafted with just a single combining algorithm, the UAL only supports the deny-overrides combining algorithm.

The UAL supports operations on strings, booleans, and bags containing those types. The following XACML functions are supported in UAL:

Comparison functions:
boolean-equal (test for Boolean equality)
string-equal (test for string equality)
Logical functions:
and (conjunction of two Booleans)
or (disjunction of two Booleans)
not (negation of a Boolean)
Bag functions:
string-is-in (test for membership of a string in a bag)
boolean-one-and-only (extraction of a single boolean value from a bag)
any-of (a primitive value matches at least one member of a bag)
all-of (a primitive value matches all members of a bag)
any-of-any (at least one member of the first bag matches a member of the second bag)
any-of-all (at least one member of the first bag matches all members of the second bag)
all-of-any (at least one member of the second bag matches all members of the first bag)
all-of-all (all members of the first bag match all members of the second bag)
string-one-and-only (a single string extracted from a bag)

In the UAL, the string-is-in function is used to test a particular role against a "role" attribute of a subject. The boolean-one-and-only function is only used to fetch boolean-valued attributes of subjects and resources.

In XACML, the functions that fetch attributes from subjects or resources always return bags. Thus, all tests of attribute values require the specification of the particular attribute, nested within a bag function that either checks for existence or returns a scalar. The following <Rule> tests to see if the subject holds a particular role:

```
<Rule RuleId="Rule1" Effect="Permit">
  <Condition FunctionId="&function;string-is-in">
    <AttributeValue
      DataType="&xml;string">CompanyAEmployee</AttributeValue>
    <SubjectAttributeDesignator DataType="&xml;string"
      AttributeId="urn:oasis:names:tc:xacml:1.0:example:subject:role"/>
  </Condition>
</Rule>
```

The above <Rule> fetches a bag containing the (possibly multiple) values of the subject's "role" attribute and then tests whether the string "CompanyAEmployee" is in the bag. If the string-is-in function returns a true value, then the <Rule> returns its Effect value of "Permit" for combining with the Effects of any other <Rule> elements in the containing <Policy> element.

The XACML specification envisions a Policy Information Point (PIP) that is responsible for managing and distributing attribute information for actions, subjects, and resources. In some implementations of the invention, subject attributes may be stored in an XML file. It also is contemplated that an LDAP directory, an SQL database, etc. could be used to store attributes. Resource attributes may be stored in XML that is wrapped around each protected resource.

The XACML specification envisions a Policy Administration Point (PAP) to facilitate policy administration, but does not specify details of the PAP service. In various implementations of the invention, UAL policy is generated from UML models as described above.

Adapters

Referring to FIG. 1, adapters 38 may generate one or more representations of the integrated policy set 36 expressed in UAL. Each representation corresponds to a target system 40. A representation may be integrated with the corresponding target system 40 to implement the policy set. In some implementations, an adapter 38 includes a library of routines for parsing UAL into a policy representation, and a target-specific set of routines to apply the representation in the corresponding target environment 40. Thus the UAL policies 36 can be transformed into access control mechanisms appropriate to each target system 40. It should be noted that adapters 38 can be used to express one common policy representation consistently across a plurality of target environments 40.

One exemplary adapter is a POSIX ACL adapter 38a that transforms policies expressed in UAL into access control lists (ACLs) on files and directories. It is assumed that some mechanism is available for looking up attributes of users and files. In one configuration, an XML file is used to contain the attributes of all users and an XML wrapper around each file is used to specify the file's attributes.

POSIX access control lists only know about three possible actions (read, write, and execute) and cannot express negative authorization. Useful policies will likely contain both positive and negative authorizations. In one implementation, a negative policy such as "subjects are denied access to export-controlled content if not US person" may be implemented, for example, by segregating all export-controlled content in a separate directory with a restrictive ACL on the directory. In another implementation, the policy is transformed for each action/resource pair into one that is exclusively positive. A negative authorization policy can be thought of as "subtracting" privilege from positive policies.

It is possible to transform a set of "Permit" and "Deny" rules into a single rule that expresses only what is permitted. Mathematically, the result is a conjunction of a disjunction of all "Permit" rules with a negation of a disjunction of all "Deny" rules. The combined expression is reduced to disjunctive normal form (DNF) by the following algorithm:

(1) If any parenthesized expression is negated, move the negation inside the parentheses by applying De Morgan's rules.

(2) Use the distributive identity to convert conjunctions of disjunctions into disjunctions of conjunctions.

The product is a disjunction of conjunctions with negations only on terms inside the conjunctions. Each term is an expression involving a single attribute of the subject or of the protected resource. Each of those terms evaluates to true or false. With policy expressed in this form, it is possible to derive ACLs that will correctly implement the policy regardless of the subdirectory containing the file.

Each of the conjunctions in the DNF form of a policy corresponds to an ACL to be applied to a file. The group to be specified in the ACL is the one corresponding to the set of users with all of the subject attributes specified by the conjunction. The POSIX ACL adapter 38a synthesizes Unix groups as needed by concatenating subject attribute names. If the conjunction contains the negation of an attribute, the resulting group name contains "not" before the attribute name. For example, if a policy expression says a subject has access if he/she is not an engineer and is a US person, users meeting that qualification would be assigned to a group called "noteng_US", and files to which the policy applies would get an ACL granting access to the noteng_US group. Users are assigned to groups by looking up their attributes and then iterating over the set of generated groups, assigning users to groups that match their attributes.

A UAL policy set may include wildcards to specify policy that applies to more than one action or resource type. The POSIX ACL adapter 38a takes this into account when it accumulates DNF policy expressions for each action/resource pair. Once all of the group names are known and users have been assigned to them, the adapter 38a iterates over the protected files and applies ACLs to them. It does this by looking up the attributes of each file (in the XML wrapping the file), and then evaluating each conjunction in the DNF expression for the file's resource class, applying the ACL corresponding to each conjunction that matches. In one implementation, a read ACL is applied to the file and read-execute ACLs are applied to all containing directories up to the root of the protected tree. (On Unix-style file systems, one may need read permission in order to see the names of things in a directory, and execute permission in order to traverse a directory to open things inside it.)

Percolation of permission up through a tree has implications for the layout of files in directories. If files with more than one set of access characteristics are mixed in a single subdirectory, that subdirectory and all containing directories will require read and execute access for all of the groups that can access any of the files in the subdirectory. This means that some users will be able to see the names of files that they do not have permission to read. It also means that all users with permission to read any file in the protected tree will have permission to see the names of files and subdirectories at the root of the protected tree even though they may lack permission to read any of them. This is not a limitation of the adapter, but rather of the limited semantics of Unix-style file systems.

Automated application of access control lists to files entails "tagging" files in some way. Accordingly, tag-containing XML could be wrapped around the content. This allows single documents with multiple content types to be accurately tagged, but may not be practical in all cases. If files could be restricted to a single content type, then type-specific directories could be used to "tag" the files. A separate file or database could be employed to carry the content type information. In addition to content tagging, the automated application of policy to files entails knowledge of roles held by users. An XML file may be used to specify roles held by each user. Alternatively, an LDAP directory, an SQL database, etc. could be used.

Although input to the POSIX ACL adapter 38a in the present example is a set of policies in UAL generated from a UML model, the adapter is not dependent on the source of the UAL.

Another exemplary adapter is a P-RBAC adapter 38c that transforms policies expressed in UAL into an equivalent set of P-RBAC policies. P-RBAC involves Policy Enforcement Points (PEPS) embedded in applications, which request access decisions from Policy Decision Points (PDPs). In one implementation, the P-RBAC adapter 38c is a special case of a PEP-enabled client of a PDP. It authenticates itself to the PDP using an X.509 identity certificate and then publishes a new policy version to the PDP. The PDP accepts the new policy if the adapter 38c authenticates as an identity possessing the proper role.

In a P-RBAC policy model, every attribute lookup in a policy condition is an action that is subject to policy. XACML has no way to express the notion that a subject might be denied access to some resource because he lacked sufficient privilege to examine attributes of the resource. The P-RBAC adapter handles this by synthesizing actions for all necessary attribute lookups and inserting policies with (true) conditions to control them.

A complete P-RBAC policy set includes action, resource and role definitions and role-to-user mappings in addition to the policies that apply to those entities. XACML does not explicitly define actions, resources, or roles. The adapter 38c uses the context in which particular names are used in the UAL to determine exactly how they should be defined in the generated policy set. The adapter 38c may get information about user roles from an XML file or from an LDAP directory.

Input UAL policies 36 may contain multiple positive or negative XACML rules for each action/resource pair. The adapter 38c reformulates the rules for each action/resource pair into an equivalent single expression in disjunctive normal form (DNF). This single expression is then translated into a P-RBAC Policy statement for the named action with the named resource as an argument.

The reformulation of the UAL policies into DNF means that it is not necessary to generate negative P-RBAC policies. XACML lacks an ability to invoke functions not defined by XACML inside policy conditions, so the generated P-RBAC policy conditions will only contain attribute lookup functions on the subject and the resource. XACML has no way to specify policy to apply to attribute lookups in policy conditions, so a generated P-RBAC policy will contain Policy statements with a Condition clause of (true) for all necessary attribute lookups.

A framework for the P-RBAC adapter 38c may include, for example, a PEP-enabled Apache web server and a P-RBAC PDP. The adapter 38c, acting as a client of the PDP, publishes its generated policy to the PDP. The protected content includes images on an Apache server that have been wrapped with XML containing resource type and attribute information. When a user attempts to browse the web server's protected content, the server looks up the attributes both of the user and the content, queries the PDP, and shows only those images that the user is authorized to access.

In the foregoing system and methods, formalized engineering processes are applied to address computer access security to provide malleable, uniform role-based access across dissimilar platforms. Using implementations of the foregoing methods and tools, an enterprise can easily establish, modify and maintain a uniform set of role-based access requirements across a wide variety of independent platforms.

Implementations of the invention provide a standards-based mechanism for appropriate implementation of authorization requirements in a large-scale SoS and consistent implementation of authorization policy across diverse access control end systems. Visibility is provided of authorization requirements that, because of end system limitations, cannot be enforced on end systems. When correctly enforced, high-level security requirements can be implemented coherently and consistently across all small systems and thus provide a valuable system integration capability for an LSI.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of controlling access to resources of a distributed system, the method comprising:
defining a plurality of authorization requirements for access to a plurality of resources of the distributed system, the distributed system having one or more processors and memory and a plurality of heterogeneous access control mechanisms for controlling user access to the resources of the distributed system, the heterogeneous access control mechanisms associated with a plurality of different access control platforms;
based on a use case diagram that abstractly describes access control behavior of the heterogeneous access control mechanisms by a "permit" use case and a "deny" use case, obtaining a model expressing contents of access control policies as would be consulted by a policy decision point, the model expressing a policy content as specifying a constraint on a decision by the policy decision point as to an action requested by a user relative to the resources, the constraints expressing the authorization requirements as conditions under which the policy decision point is to permit or deny the action;
expressing the policy contents from the model in an access control markup language that provides a single expression of policy adaptable across the different access control platforms for enforcement in the heterogeneous access control mechanisms;
using one or more adapters, obtaining from the single expression of policy a plurality of heterogeneous representations of the single expression of policy, the heterogeneous representations corresponding to the heterogeneous access control mechanisms;
integrating the heterogeneous representations with the corresponding heterogeneous access control mechanisms to implement the single expression of policy through the heterogeneous access control mechanisms; and
using the heterogeneous access control mechanisms, controlling access by users of the distributed system to the resources in accordance with the single expression of policy.

2. The method of claim 1, further comprising parsing and transforming elements of the access control markup language to obtain elements of one of the heterogeneous access control mechanisms.

3. The method of claim 1, wherein the heterogeneous access control mechanisms are included in the following systems: an access-control-list-based authorization system, a legacy authorization system, and a policy-enabled authorization system.

4. The method of claim 1, wherein obtaining the model comprises using UML and OCL.

5. The method of claim 1, further comprising configuring the single expression of policy as access control policies for consultation by decision points of at least one of the heterogeneous access control mechanisms.

6. The method of claim 1, wherein the single expression of policy comprises an XACML policy set.

7. A method of controlling access to resources of a distributed system, the method comprising:
defining a plurality of authorization requirements for access to a plurality of resources of the distributed system, the distributed system having one or more processors and memory and a plurality of heterogeneous access control mechanisms for controlling user access to the resources of the distributed system, the heterogeneous access control mechanisms associated with a plurality of different access control platforms;
abstractly describing access control behavior of the heterogeneous access control mechanisms by a use case diagram having only a "permit" use case and a "deny" use case;
modeling the two use cases as constraints on a decision by a policy decision point as to a user-requested action relative to the resources, the modeling performed to obtain a model expressing policy content as would be consulted by the policy decision point, the model expressing the authorization requirements in the policy content as conditions in the constraints, the constraints consisting of Permit constraints and Deny constraints;
generating from the model a plurality of access control policies having one or more rules for each of the constraints, the policies expressed in an access control markup language that provides a single expression of policy adaptable across the different access control platforms for enforcement of the rules in each of the heterogeneous access control mechanisms;
adapting the access control markup language expressions of the rules into forms compatible with the heterogeneous access control mechanisms;
incorporating the compatible forms into the heterogeneous access control mechanisms to implement the access control policies through the access control mechanisms; and
using the access control mechanisms, controlling access by users of the distributed system to the resources of the distributed system in accordance with the access control policies.

8. The method of claim 7, wherein adapting the rules comprises parsing the access control markup language.

9. The method of claim 7, wherein adapting the access control markup language expressions of the rules into forms comprises:
conjoining a disjunction of permit rules with a negation of disjunction of deny rules to obtain a single rule; and
reducing the single rule to disjunctive normal form to obtain a plurality of access control lists (ACLS) for use by one or more of the heterogeneous access control mechanisms.

10. The method of claim 7, wherein adapting the access control markup language expressions of the rules further comprises converting a policy into an access control list (ACL).

11. The method of claim 7, wherein adapting the access control markup language expressions of the rules comprises configuring the policy contents for consultation by decision points of at least one of the heterogeneous access control mechanisms.

12. A method of controlling access to resources of a distributed system, the method comprising:
defining a plurality of natural-language authorization requirements for access to a plurality of resources of the distributed system, the distributed system having one or more processors and memory and a plurality of heterogeneous access control mechanisms for controlling user access to the resources of the distributed system, the heterogeneous access control mechanisms associated with a plurality of different access control platforms;
based on a use case diagram having only a "Permit" use case and a "Deny" use case that abstractly describe access control behavior of the heterogeneous access control mechanisms, obtaining a model expressing the authorization requirements as conditions in "Permit"

and "Deny" constraints on a decision by a policy decision point as to an action requested by a user as to the resources, the model expressing policy content as would be consulted by the policy decision point, the "Permit" constraints and "Deny" constraints being the only constraints in the policy content;

expressing the policy content from the model in an access control markup language to obtain a single expression of the policy content that is adaptable across the different access control platforms and from which the policy content is adaptable for enforcement in the heterogeneous access control mechanisms;

using one or more adapters, obtaining from the single expression of the policy content a plurality of heterogeneous forms of the policy content corresponding to the heterogeneous access control mechanisms;

integrating the heterogeneous forms with the corresponding access control mechanisms to implement the policy content through the heterogeneous access control mechanisms; and using the access control mechanisms, controlling access by users of the distributed system to the resources in accordance with the policy content.

13. The method of claim 12, further comprising:
from each of the constraints, generating one or more rules expressing one or more of the authorization requirements; and
adapting the rules to a target system including one of the heterogeneous access control mechanisms.

14. The method of claim 13, wherein each of the rules has either a permit effect or a deny effect.

15. The method of claim 13, wherein the rules are role-based.

16. The method of claim 12, wherein the heterogeneous access control mechanisms are included in the following target systems: an access-control-list-based authorization system, a legacy authorization system, and a policy-enabled authorization system.

17. The method of claim 12, wherein the heterogeneous access control mechanisms include an access-control-list-based mechanism and a policy-enabled mechanism.

18. The method of claim 12, further comprising mapping the authorization-markup-language policy set to authorization mechanisms of an access control system, the mapping performed using an adapter.

* * * * *